(12) United States Patent
Krasnov et al.

(10) Patent No.: US 9,341,748 B2
(45) Date of Patent: May 17, 2016

(54) MIRROR FOR USE IN HUMID ENVIRONMENTS, AND/OR METHOD OF MAKING THE SAME

(71) Applicant: Guardian Industries Corp., Auburn Hills, MI (US)

(72) Inventors: Alexey Krasnov, Canton, MI (US); Willem Den Boer, Brighton, MI (US); Lisa Green, Auburn Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 235 days.

(21) Appl. No.: 13/974,722

(22) Filed: Aug. 23, 2013

(65) Prior Publication Data
US 2014/0055857 A1    Feb. 27, 2014

Related U.S. Application Data

(63) Continuation-in-part of application No. 13/754,025, filed on Jan. 30, 2013, which is a continuation-in-part of application No. 13/338,644, filed on Dec. 28, 2011.

(51) Int. Cl.
*G02B 7/182* (2006.01)
*G02B 5/08* (2006.01)
(Continued)

(52) U.S. Cl.
CPC .......... *G02B 1/105* (2013.01); *B32B 17/10018* (2013.01); *B32B 17/10229* (2013.01);
(Continued)

(58) Field of Classification Search
CPC .............. G02B 1/14; G02B 5/08; G02B 5/32; C03C 17/10

USPC ............................ 359/883, 884, 900; 427/165
See application file for complete search history.

(56) References Cited

U.S. PATENT DOCUMENTS 4,056,313 A    11/1977 Arbogast
4,059,094 A    11/1977 Barrio de Mendoza
(Continued)

FOREIGN PATENT DOCUMENTS

DE    36 26 780          2/1988
DE    198 07 930 A1      9/1999
(Continued)

OTHER PUBLICATIONS

Surface Production Tapes, SPV 9300 Series Datasheet, Nitto Denko, Edition Apr. 2009.*
(Continued)

*Primary Examiner* — Mohammed Hasan
*Assistant Examiner* — Rahman Abdur
(74) *Attorney, Agent, or Firm* — Nixon & Vanderhye P.C.

(57) ABSTRACT

Certain example embodiments of this invention relate to sputtered aluminum second surface mirrors with tapes optionally provided thereto, and/or methods of making the same. The tape replaces the paint backing that conventionally is used in the mirror industry to help protect the reflecting member of the mirror from the ingress of moisture. The final layer of the thin film layer stack is selected so as to help make its interface with the tape less sensitive to moisture. Because the safety tape can remain adhered to the layer stack even in high humidity environments, such minors may be used in a potentially broader array of applications and/or environments such as, for example, bathrooms, interior and/or exterior applications in areas where there are humid climates, etc. In one of the example embodiments, the tape is a safety tape.

19 Claims, 4 Drawing Sheets

(51) Int. Cl.
- *G02B 1/10* (2015.01)
- *B32B 17/10* (2006.01)
- *C03C 17/36* (2006.01)
- *C03C 17/38* (2006.01)

(52) U.S. Cl.
CPC ............ *C03C17/3663* (2013.01); *C03C 17/38* (2013.01); *G02B 5/0808* (2013.01); *G02B 5/0858* (2013.01); *G02B 5/0866* (2013.01)

(56) References Cited

U.S. PATENT DOCUMENTS

| | | |
|---|---|---|
| 4,117,682 A | 10/1978 | Smith |
| 4,161,942 A | 7/1979 | Monk |
| 4,237,864 A | 12/1980 | Kravitz |
| 4,572,160 A | 2/1986 | Blikken et al. |
| 4,608,964 A | 9/1986 | Russo |
| 4,639,069 A | 1/1987 | Yatabe et al. |
| 4,780,372 A | 10/1988 | Tracy et al. |
| 4,963,012 A * | 10/1990 | Tracy ............ C03C 17/36 359/514 |
| 5,030,594 A | 7/1991 | Heithoff |
| 5,195,503 A | 3/1993 | Ludlow |
| 5,275,149 A | 1/1994 | Ludlow |
| 5,347,402 A | 9/1994 | Arbogast |
| 5,514,476 A | 5/1996 | Hartig et al. |
| 5,583,704 A | 12/1996 | Fujii |
| 5,861,189 A * | 1/1999 | Sheel ............ C03C 17/09 427/166 |
| 5,965,246 A | 10/1999 | Guiselin et al. |
| 6,050,526 A | 4/2000 | Stribling, Jr. |
| 6,078,425 A | 6/2000 | Wolfe et al. |
| 6,142,642 A | 11/2000 | Krisko et al. |
| 6,447,891 B1 * | 9/2002 | Veerasamy ............ B05D 5/083 428/216 |
| 7,004,592 B2 * | 2/2006 | Varaprasad ............ B32B 17/06 359/265 |
| 7,147,924 B2 * | 12/2006 | Stachowiak ........ C03C 17/3435 428/428 |
| 7,166,359 B2 | 1/2007 | Kriltz et al. |
| 7,276,289 B2 | 10/2007 | Lu et al. |
| 7,557,053 B2 | 7/2009 | Thomsen et al. |
| 7,678,459 B2 | 3/2010 | Scott et al. |
| 7,700,869 B2 | 4/2010 | Thomsen et al. |
| 7,871,664 B2 | 1/2011 | O'Connor et al. |
| 2005/0018330 A1 | 1/2005 | Saloo et al. |
| 2006/0077580 A1 | 4/2006 | Wuillaume et al. |
| 2007/0178316 A1 | 8/2007 | Mellott |
| 2007/0215205 A1 | 9/2007 | Thomsen et al. |
| 2007/0221313 A1 | 9/2007 | Franck et al. |
| 2007/0223096 A1 | 9/2007 | O'Connor et al. |
| 2007/0223121 A1 | 9/2007 | Franck et al. |
| 2007/0291384 A1 | 12/2007 | Wang |
| 2008/0073203 A1 | 3/2008 | Wang et al. |
| 2008/0164173 A1 | 7/2008 | Savakus |
| 2009/0020712 A1 | 1/2009 | Matsumoto |
| 2009/0101208 A1 | 4/2009 | Vandal et al. |
| 2009/0178735 A1 | 7/2009 | Enokido et al. |
| 2009/0217978 A1 | 9/2009 | Thomsen et al. |
| 2009/0223252 A1 | 9/2009 | Fulton et al. |
| 2009/0233037 A1 | 9/2009 | Medwick et al. |
| 2009/0233106 A1 * | 9/2009 | Medwick ............ C03C 17/36 428/432 |
| 2010/0122728 A1 | 5/2010 | Fulton et al. |
| 2010/0229853 A1 | 9/2010 | Vandal et al. |
| 2010/0243032 A1 | 9/2010 | Mori et al. |
| 2010/0255980 A1 | 10/2010 | Fulton et al. |
| 2011/0176212 A1 | 7/2011 | Lu et al. |
| 2011/0176236 A1 | 7/2011 | Lu et al. |
| 2012/0087029 A1 | 4/2012 | Vandal et al. |
| 2013/0170059 A1 | 7/2013 | Lingle et al. |
| 2013/0208375 A1 | 8/2013 | Krasnov et al. |

FOREIGN PATENT DOCUMENTS

| | | |
|---|---|---|
| DE | 10 2005 000 911 A | 7/2006 |
| EP | 1 113 295 | 7/2001 |
| EP | 1 918 740 | 5/2008 |
| JP | 63-252945 | 10/1988 |
| JP | 9-30838 | 2/1997 |
| KR | 10-2009-0132794 | 12/2009 |
| WO | WO 91/16197 | 10/1991 |
| WO | WO 2013/101762 | 7/2013 |

OTHER PUBLICATIONS

U.S. Appl. No. 13/754,025, filed Jan. 30, 2013; Krasnov et al.
International Search Report mailed May 23, 2013.
SPV 9300 Series Datasheet from Nitto Denko Corporation, Apr. 2009.
U.S. Appl. No. 13/338,644, filed Dec. 28, 2011; Lingle et al.
U.S. Appl. No. 61/282,307, filed Jan. 19, 2010; Lu et al.
U.S. Appl. No. 12/929,087, filed Dec. 29, 2010; Lu et al.
U.S. Appl. No. 12/923,836, filed Oct. 8, 2010; Vandal et al.
International Search Report dated Apr. 1, 2011.
Nitto Denko, SPV 30800 Series, Surface Protection Tapes, Dec. 2007 (2 pgs.).
Nitto Denko, SPV A-Series, Surface Protection Tapes, Dec. 2007 (2 pgs.).
Nitto Denko, Product SPV 9310-SPV 9320; Surface Protection Tapes, Dec. 2007 (2 pgs.).
Nitto Denko, Product SPV 5057 A5; Surface Protection Tape, retrieved Oct. 4, 2013 (2 pgs.).

* cited by examiner

MIRROR FOR USE IN HUMID ENVIRONMENTS, AND/OR METHOD OF MAKING THE SAME

This is a Continuation-in-Part (CIP) of U.S. application Ser. No. 13/754,025, filed Jan. 30, 2013, which is a CIP of U.S. application Ser. No. 13/338,644, filed Dec. 28, 2011, the entire disclosure of each of which is hereby incorporated herein by reference.

Certain example embodiments of this invention relate to second surface mirrors, and/or methods of making the same. More particularly, certain example embodiments relate to sputtered aluminum second surface minors with protective adhesive materials (e.g., tapes) optionally provided thereto, and/or methods of making the same. In certain example instances, such mirrors may be used in interior residential, commercial, appliance, and/or other applications, where it is desirable to protect against the encroachment of humidity, e.g., at the interface between the thin film and the adhesive material.

BACKGROUND AND SUMMARY OF EXAMPLE EMBODIMENTS OF THE INVENTION

Mirrors have been in existence for years and have been used in interior building applications such as, for example, in bathrooms, as decorations, etc.; for exterior applications such as, for example, in concentrating solar power (CSP) and concentrating photovoltaic (CPV) applications, as well as in secondary reflector panels (SRPs); as well as handheld vanity and a host of other products. Mirrors generally are either (a) first surface minors, where the mirror coating is provided between the viewer and the supporting glass substrate, or (b) second surface mirrors, where the supporting glass substrate is interposed between the viewer and the mirror coating. See, for example, U.S. Pat. Nos. 7,276,289 and 7,678,459; U.S. Publication Nos. 2006/0077580; 2007/0178316; 2008/0073203; 2008/0164173; 2010/0229853; 2011/0176212; and 2011/0176236; as well as U.S. application Ser. No. 12/923,836, filed on Oct. 8, 2010. The entire contents of each of these patent documents are hereby incorporated herein by reference.

Many second surface mirrors include silver-based reflecting layers. Silver is highly reflective in the visible and infrared ranges, therefore making it a good choice from a total reflectance perspective. And because silver is a noble metal, it tends to react with other elements a relatively low amount. Because of these properties, and as one common example, second surface silver mirrors have widely been used as home mirrors since 1835, when the silvering process was discovered. Although the chemistry of the wet silvering process has significantly changed since then, the concept remains the same: The rear side (second surface) of the glass substrate is wet-coated with a shiny film of reflective silver, which is then covered with a protective layer of paint to prevent tarnishing and corrosion.

Unfortunately, however, silver is quite expensive. It also is not particularly durable and, for example, is subject to corrosion when exposed to even building interior environments. Durability problems can be overcome with silver-inclusive minors, however, by applying one or more layers of protective paint. Yet these paints are sometimes expensive and, at a minimum, inject time delays in the process because they need to be coated and dried and sometimes re-coated and re-dried. Wet coating techniques also are "messy" and potentially hazardous to humans. Even silver production itself is known to be an environmentally unfriendly process, as it is known that (for instance) about two-thirds of the global silver production is accompanied by a substantial release of mercury.

Thus, it will be appreciated that there is a need in the art for improved minors and/or methods of making the same.

Relatively recently, physical vapor deposition (PVD) techniques such as, for example, sputtering, have been used to efficiently deposit aluminum (Al) minors. It is for example known to replace the silver in a minor with the aluminum. Reflectance in at least the visible range remains high, notwithstanding this substitution.

Despite the fact that the Al is highly reactive, it possesses a natural defense mechanism against corrosion and tarnishing, e.g., by means of a very thin, very stable, and highly transparent oxide layer that forms at its surface. The presence of this oxide layer helps to prevent the rest of the Al from further oxidation. The sputtering process is also much more environmentally friendly compared to silvering. And because aluminum is the third most abundant element in nature and the most abundant metal in the Earth's crust, it tends to be much less expensive than silver. Indeed, a 1:600 cost ratio is common.

Certain example embodiments relate to a second-surface sputtered thin-film mirror deposited on glass and protected with an adhesive tape. The tape replaces the paint backing that conventionally is used in the minor industry to help protect the reflecting member of the mirror from the ingress of moisture. The final layer of the thin film layer stack is selected so as to help make its interface with the tape less sensitive to moisture. Because the safety tape can remain adhered to the layer stack even in high humidity environments, such mirrors may be used in a potentially broader array of applications and/or environments such as, for example, bathrooms, interior and/or exterior applications in areas where there are humid climates, etc. In one of the example embodiments, the tape is a safety tape. Methods of making the same also are provided.

In certain example embodiments of this invention, a mirror is provided. The minor includes a glass substrate. A multilayer thin film coating is supported by the substrate. The multilayer thin film coating comprises, in order moving away from the substrate: a first dielectric layer, a metallic or substantially metallic layer comprising aluminum, and a second dielectric layer, with the second dielectric layer being the outermost layer of the thin film coating and having a contact angle of at least 40 degrees. An adhesive material is disposed directly over and contacting the outermost layer of the multilayer thin film coating.

In certain example embodiments of this invention, a mirror is provided. The minor includes a glass substrate. A multilayer thin film coating is supported by the substrate. The multilayer thin film coating comprises a metallic or substantially metallic layer comprising aluminum sandwiched between inner and outer dielectric layers, with the inner dielectric layer being located between at least the substrate and the metallic or substantially metallic layer comprising aluminum. An adhesive tape is directly over and contacting an outermost layer of the multilayer thin film coating. The adhesive tape is adapted to survive seven day exposure to an 85 degree C. temperature at 85% relative humidity, as well as seven day exposure to a 49 degree C. temperature at 100% relative humidity, without peeling away from the outermost layer of the thin film coating.

In certain example embodiments of this invention, a method of making a mirror is provided. At least the following layers in the following order are sputter-deposited on a glass substrate to form a coating: a first dielectric layer, a metallic or substantially metallic layer comprising aluminum, and a second dielectric layer. The second dielectric layer is the outermost layer of the thin film coating and has a contact angle of at least 40 degrees. An adhesive material is applied over and contacting the outermost layer of the multilayer thin film coating.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1A:
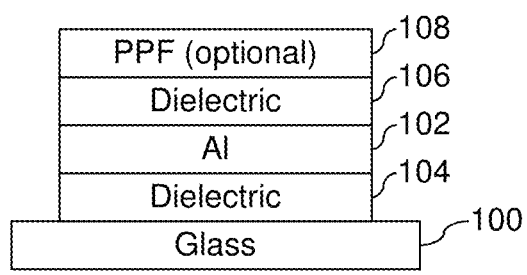
FIGS. 1a and 1b show schematic cross-sectional views of second surface mirror coatings in accordance with certain example embodiments of this invention.

Certain example embodiments of this invention relate to high performance sputtered aluminum second surface mirrors with permanent protective adhesive films optionally provided thereto, and/or methods of making the same. In certain example instances, such mirrors may be used in interior residential, commercial, appliance, and/or other applications, e.g., where it is desirable to provide very high visible glass side reflectance while keeping associated production costs low.

In certain example embodiments, a coated article is provided. The coated article may comprise a substrate supporting a multi-layer, thin film coating including at least the following layers, in order, moving away from a second surface of the substrate: a first silicon-based layer (e.g., an oxide and/or nitride of silicon), a metallic or substantially metallic reflective layer comprising aluminum, optionally in direct contact with the first silicon-based layer; and a second silicon-based or other dielectric layer (e.g., an oxide and/or nitride of silicon) that serves as a protective layer. The first and second silicon-based layers may consist essentially of the same composition and/or may have substantially the same stoichiometries in certain example embodiments. In certain example embodiments, the first and/or second dielectric layers may be of or include a silicon inclusive based layer such as silicon nitride or silicon oxynitride. In other example embodiments, the first and/or second dielectric layers may be of or include other material such as aluminum oxide, aluminum oxynitride, zirconium oxide, titanium oxide, yttrium oxide, zinc oxide, zinc aluminum oxide, tin oxide or the like. Optionally, a protective barrier layer comprising Ni and/or Cr may be interposed between the reflective layer and the second dielectric layer. A permanent protective film (PPF) may be applied to the film side of this layer stack for added overall durability. The PPF may be applied in solid form in certain example embodiments.

The aluminum-inclusive second surface mirrors of certain example embodiments may be advantageous over conventional silver-based second surface mirrors. For example, the lower material cost for aluminum may result in a reduced cost to coat as compared to a silver-based mirror. Aluminum also is known to have superior chemical, mechanical, and environmental durability as compared to silver. Certain example embodiments also may offer superior adhesion of the reflective metal to a broader range of underlying layers and/or substrates as compared to conventional mirrors. For instance, aluminum adheres well to silicon-based thin film layers, whereas silver growth is known to benefit from the presence of seed layers (e.g., of or including zinc oxide and/or an optionally oxidized Ni and/or Cr inclusive layer) in terms of both adhesion and uniformity. Aluminum also better adheres to bare glass than silver. The reflective optical properties for aluminum are also very similar to silver, even though aluminum is advantageous in the above-described and/or other ways.

Some current second surface mirrors incorporate a protective paint on the film side of the coated article. The protective paint is intended to increase chemical, mechanical, and environmental durability. This protective paint can be particularly important where silver-based sputter deposited second surface mirrors are concerned, as the silver can be damaged very easily, e.g., via scratching or marring, via oxidation through normal environmental exposure or inadvertent chemical attack, etc. By contrast, certain example embodiments replace the typically used protective paint with a permanent protective film. The removal of the paint and replacement with a permanent protective film can actually lower the cost of the final product while also conferring a number of other advantages. For example, costly paint application hardware and drying systems can be replaced with lower-cost roll application of the permanent protective plastic film. This, in turn, may impart a substantial increase in throughput speed as compared to protective paints, e.g., because application may be simplified and drying/curing steps may be removed. There also is an opportunity to substantially reduce environmentally hazardous waste, thereby possibly also reducing clean room, maintenance, and disposal costs. The roll application technique also may reduce labor and utility costs, while also offering savings in safety related fabrication costs. For instance, protective paints oftentimes necessitate risk management procedures associated with, for example, chemical storage, application, training, personal protective equipment (PPE), etc.

The protective film may also help enhance the safety of the final product as compared to existing mirrors with standard protective paints. For instance, plastic protective films tend to better trap and/or contain material that may flake or otherwise come off. This also applies to glass shards that may result if the mirror is broken. The paints also may be hazardous when ingested or exposed to the skin, whereas plastic protective films may be harmful only in much larger doses.

Figure 1B:
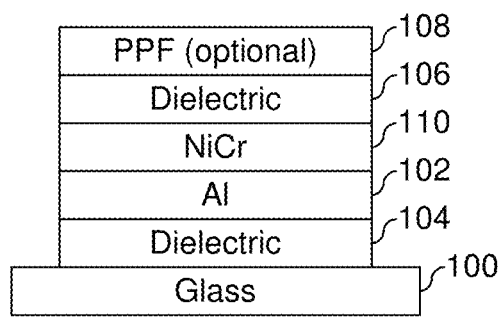

FIGS. 1a and 1b show schematic cross-sectional views of second surface mirror coatings in accordance with certain example embodiments of this invention. The mirrors in FIGS. 1a-1b are second surface mirrors, because the incident light passes through the substrate 100 before being reflected by the mirror's aluminum based reflective layer 102. As shown in FIG. 1a, a glass substrate 100 supports a mirror coating including plural sputter-deposited thin film coatings and an optional PPF. More particularly, as shown in FIG. 1a, an Al-based metallic layer 102 is sandwiched between first and second layers including silicon nitride (e.g., $Si_3N_4$ or other suitable stoichiometry) 104 and 106. A PPF film 108 is optionally provided as an outermost protective coating. The Al-based metallic layer may be a "3-9s purity" or commercial grade T6061 aluminum alloy in certain example instances. In the FIG. 1a example, the Al-based metallic layer 102 is in direct contact with the first and second layers including silicon nitride 104 and 106 or of other dielectric material.

The layer stack design shown in FIG. 1b is identical to the FIG. 1a design, except that a layer including Ni and/or Cr 110 (NiCr in the FIG. 1b example) has been added. This layer including Ni and/or Cr 110 may be used to increase chemical, mechanical, and environmental durability, as may be the case when the aluminum mirror stack is provided without the optional permanent protective plastic film 108.

Figure 2:
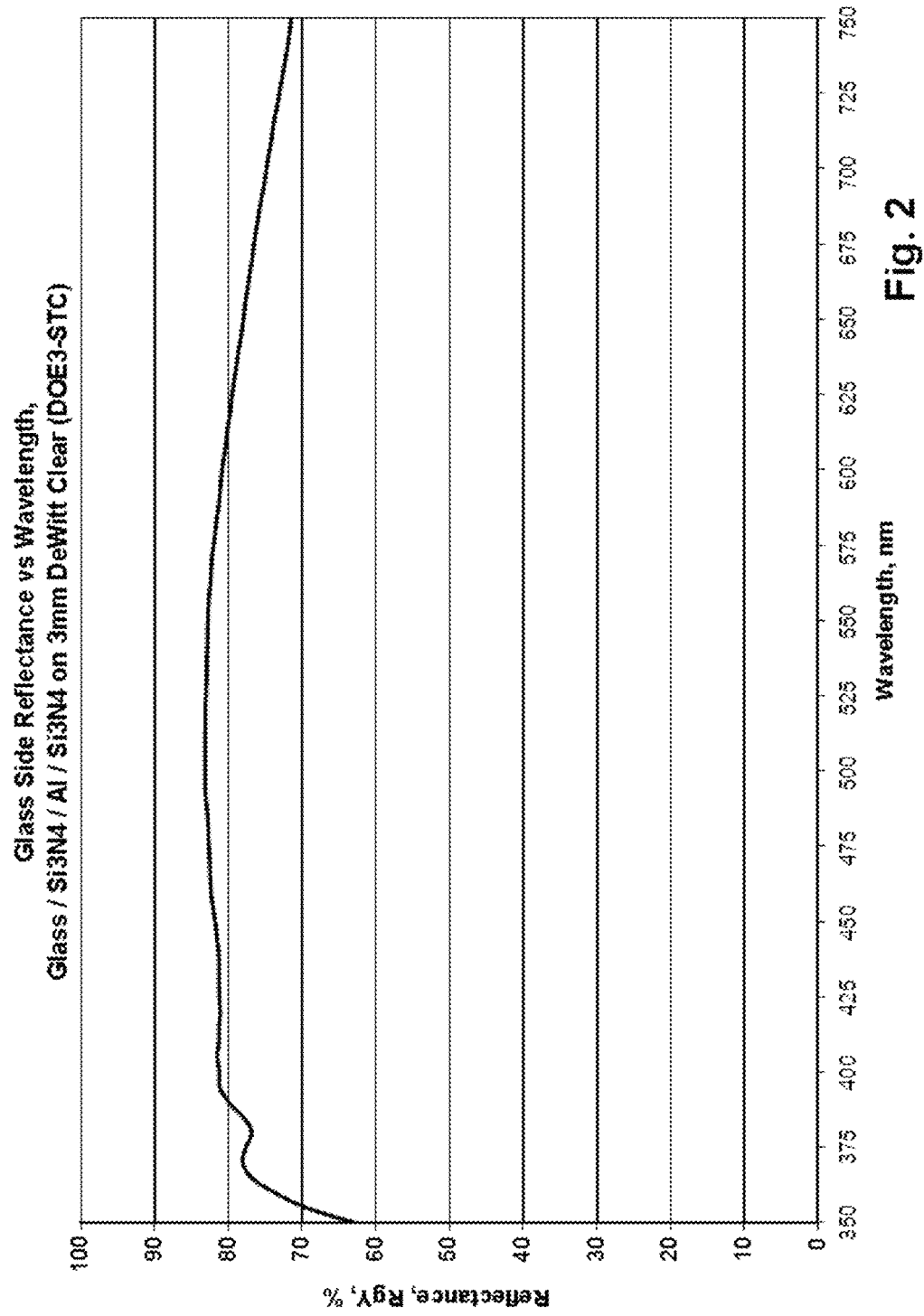
FIG. 2 is a graph that plots glass side reflectance versus wavelength for the FIG. 1a example embodiment over the 350-750 nm wavelength range.

The FIG. 1a layer stack was coated on a 3.0 mm thick clear float glass substrate. The Al-based metallic layer 102 was 450 angstroms thick, and the first and second layers including silicon nitride or other dielectric material 104 and 106 were 40 angstroms thick and 80 angstroms thick, respectively. No PPF was provided in this sample. The glass side reflectance was measured with a Perkin-Elmer double beam spectrophotometer. The data was corrected to an NIST traceable standard over the visible wavelength range. Visible glass side reflectance was calculated using an Ill. 'C', 2 degree observer. With these parameters, glass side visible reflectance, RgY, was measured at 82.03%. FIG. 2 is a graph that plots glass side reflectance versus wavelength for the FIG. 1a example embodiment, assuming silicon nitride based dielectric layers, over the 350-750 nm wavelength range. It is noted that a thinner (e.g., 2.3 mm clear float) glass substrate would have result in slightly higher glass side reflectivity.

In FIGS. 1a and 1b, the Al-based metallic layer 102 preferably is 200-800 angstroms thick, more preferably 300-700 angstroms thick, and still more preferably 400-600 angstroms thick. Thickness ranges from 250-650 angstroms also are effective in certain example instances. The Al-based metallic layer 102 layer is primarily responsible for the very high reflectance in the visible (and near infrared) portion of the spectrum. At this thickness level, light transmission is reduced to about 1% over the visible and near infrared portion of the solar spectrum. The thickness of the Al-based metallic layer 102 may be increased or decreased to raise or lower reflectance, keeping all else equal. Certain example embodiments preferably provide a glass side reflectance (Ill. C/2 degrees) of >70%, more preferably >75%, with example reflectances of 77% and 82% being possible for different desired applications. Such reflectances may be measured on ~2.3 mm (e.g., 2-3 mm) thick clear float glass substrates. It is noted that the provision of an Al-based layer between 250-360 angstroms, when applied to 3.0 mm clear float glass, can be used in connection with the techniques described herein to produce a glass side reflectance of about 78% with a light transmission of about 1.5%.

In FIG. 1a and/or FIG. 1b, the reflective layer 102 is metallic or substantially metallic. In FIG. 1a and/or FIG. 1b, first dielectric layer 104 (which is preferably sputter-deposited) may be of or include any of: silicon nitride (e.g., $Si_3N_4$) which may or may not be doped with aluminum, silicon oxide (e.g., $SiO_2$) which may or may not be doped with aluminum, silicon oxynitride which may or may not be doped with aluminum, aluminum oxide, aluminum oxynitride, zirconium oxide, titanium oxide, yttrium oxide (e.g., $Y_2O_3$), zinc oxide, zinc aluminum oxide, or tin oxide. Likewise, in FIG. 1a and/or FIG. 1b, second dielectric layer 106 (which is preferably sputter-deposited as preferably are layers 104, 102 and 110) may be of or include any of: silicon nitride (e.g., $Si_3N_4$) which may or may not be doped with aluminum, silicon oxide (e.g., $SiO_2$) which may or may not be doped with aluminum, silicon oxynitride which may or may not be doped with aluminum, aluminum oxide, aluminum oxynitride, zirconium oxide, titanium oxide, yttrium oxide (e.g., $Y_2O_3$), zinc oxide, zinc aluminum oxide, or tin oxide. First dielectric undercoat layer 104, which may be in contact with the glass 100, may have a thickness of less than 100 angstroms, with an example thickness of 40 angstroms. The use of a silicon nitride inclusive undercoat in SunGuard layer stacks has been shown to improve the chemical, environmental, and mechanical durability of the full stack compared to an otherwise identical layer stack that does not employ such an undercoat layer. The same has been shown in experiments for the aluminum minor layer stack of certain example embodiments. That is, while aluminum generally adheres poorly to float glass, the addition of a very thin layer including silicon nitride or the like between the aluminum layer and the float glass improves adhesion dramatically.

However, maintaining the undercoat layer 104 thickness at less than 40 angstrom reduces the loss of visible reflectance of the overall layer stack while also maintaining the improvements in durability mentioned above. Thus, a thickness for layer 104 of from 10-200 angstroms, more preferably less than 100 angstroms, and sometimes even less than 40 angstroms, is desirable for layer 104 both for good adhesion and high reflectivity. In certain example embodiments, the layer 104 is preferably less than 100 angstroms thick, more preferably less than 75 angstroms thick, and still more preferably less than 50 angstroms thick.

A very thin Ni and/or Cr inclusive layer 110 optionally may be deposited after the Al-inclusive metal layer 102 to further improve overall durability. The thickness of this optional layer 110, when provided, preferably is between 1-150 angstroms, more preferably 1-50 angstroms, and still more preferably 5-20 angstroms. In general, a thickness of even 5-10 angstroms has been found to increase overall durability. The layer 110 comprising Ni and/or Cr also may help reduce the visible transmission to nearly 0%, possibly also improving visible reflectivity and also helping to adhere the Al-based layer 102 to the protective overcoat layer 106. The ratio of Ni-to-Cr may be 80/20, or any other suitable ratio. It is noted that a layer comprising NiCr may add complexity and expense, and may not always be necessary as the aluminum-based mirror layer stack can in some implementations be adequately protected by a permanent protective plastic film. Thus, certain example embodiments may omit a layer comprising Ni and/or Cr, e.g., when a PPF is provided, although these material are not necessarily mutually exclusive alternatives in all embodiments. It is noted that the layer comprising Ni and/or Cr may serve as an "environmentally protective layer" but also may help increase overall coating thickness in a manner that helps reduce light transmission (e.g., preferably below 3%, more preferably below 2%, and still more preferably below 1-1.5%, and possibly all the way to 0%). The layer 110 of or including Ni and/or Cr, may or may not be oxided or nitrided in different example embodiments. This may be advantageous because it may reduce the need to increase the thickness of the layer comprising aluminum and/or to provide an opaque PPF, e.g., in order to accomplish suitable visible light transmission reductions.

The second dielectric layer 106 is preferably 10-1000 angstroms thick, more preferably 10-200 angstroms thick, possibly 50-500 angstroms thick, and more preferably 70-200 angstroms thick. This layer may help provide mechanical, chemical, and environmental durability. It also may be much thicker than the undercoat dielectric layer 104, as its thickness will have little to no practical impact on glass side reflectivity of the mirror. In practice, a thickness of about 80 angstroms has been found to be sufficient to provide adequate overall durability at reasonable cost. It is noted that the thickness may be increased in the absence of PPF or decreased when PPF is present, although this need not always be the case, e.g., where further durability is desirable. In example embodiments, the thickness of the mirror coating, not including the PPF layer, may be from 300-2,000 angstroms thick.

Certain example embodiments may incorporate a permanent protective film (PPF) 108 with very high adhesion levels, very good chemical resistance, and/or excellent environmental durability. The protective film may be resistant to delamination from moisture penetration and/or the use of asphaltic based adhesives applied to the exterior surface of the protective film. Adhesive strengths of the protective films are greater than or equal to 150 cN/20 mm wide strip, more preferably 275 cN/20 mm wide strip, as measured in the tape removal test. For instance, certain example embodiments may have an adhesive strength of 200-500 cN/20 mm wide strip, more preferably 200-300 cN/20 mm wide strip. Certain example embodiments may even have an adhesive peel strength of greater than or equal to about 320-430 cN/20 mm wide strip. The peel strength test used may be the peel strength test defined in EN 1939. Good abrasion resistance also is desirable, e.g., such that the there is no change in visible appearance when viewed from the glass side after the post-PPF coated article is wiped with a rubber material at a force of 250-250 g, back and forth 20 times. In certain example embodiments, the PPF may be thin, e.g., having a thickness of <200 microns, and sometimes about 40-100 microns in thickness. Peel strength may be increased through the incorporation of additional cross-linking polymers in certain example embodiments.

The protective film 108 may also be relatively low in cost. To aid in manufacturing ease of setup, it would be desirable to use a permanent protective film that may be applied using the same equipment that is used to apply standard temporary protective films. Typical PPF protective films from Nitto-Denko include: SPV-9310, SPV-9320, SPV-30800, SPV 5057 A5, and SPV 5057 A7. Other manufacturers of similar preferred protective films that may be used for PPF 108 include Permacel, Tessa Tapes, B&K Films, and Novacell 9084 tape. These plastic films come in a wide variety of opacities and colors.

The PPFs of certain example embodiments preferably will pass environmental tests including, for example, high temperature-high humidity testing (e.g., at 49 degrees C. with 100% relative humidity), thermal cycling testing, and 85/85 testing (e.g., 85 degrees C. with 85% relative humidity). Standard ASTM tests may be performed to test for compliance, e.g., using 7 days exposure cycles. Salt fog exposure (e.g., to simulate oversees shipment) also may be tested for a 24-hour period. Permanent plastic films that do not blister or lose adhesion to the coated surface are preferred. Resistance to cutting oils and Windex also may be tested by soaking in such materials over 24 hour periods. These tests may be performed after the PPF is applied. PPFs that survive these tests are preferred because of their apparent durability and ability to withstand environmental conditions. In a similar vein, the thin film coating preferably does not delaminate after 3M 610 Scotch tape is applied thereto and removed therefrom.

It has been found that the addition of the permanent plastic protective films significantly enhances the safety of the final product. For example, as alluded to above, when a mirror is broken, pieces and shards of glass sometimes adhere very strongly to the protective film. The few remaining smaller pieces of the broken minor that do not adhere to the protective film are far less likely to cause injury to anyone in the vicinity of the minor when the mirror is broken.

Also as alluded to above, one advantage of plastic protective films compared to commercially available protective paints is the speed of application. In many current sputter coating facilities, for example, the typical roll applicator is able to apply the protective films at line speeds of 8.0 m/min. or greater. This is much faster than the typical process speed of 5.5 m/min. used to dry the paint in the painted minor product. As was also previously mentioned, there is a reduced set of chemical safety issues related to the application of the protective film as compared to chemical paints.

A number of layer stacks in addition or as alternatives to the examples shown in FIGS. 1a and 1b are envisioned and can be produced on production sputtering machines at suitable line speeds. Certain of these example stacks are described in the following examples:

EXAMPLE 1

Glass/$Si_3N_4$ (40 angstroms)/Al (400 angstroms)/NiCr (50 angstroms)/$Si_3N_4$ (80 angstroms). RgY (C/2): 82.32%

EXAMPLE 2

Glass/$Si_3N_4$ (40 angstroms)/Al (400 angstroms)/Cr (50 angstroms)/$Si_3N_4$ (80 angstroms). RgY (C/2): 81.83%. It will be appreciated that the presence of Ni together with Cr in the layer "behind" the Al improves reflectivity.

EXAMPLE 3

Glass/$Si_3N_4$ (40 angstroms)/NiCr (5 angstroms)/Al (400 angstroms)/NiCr (50 angstroms)/$Si_3N_4$ (80 angstroms). RgY (C/2): 78.87%. While the presence of a layer comprising Ni and/or Cr interposed between the Al and the glass substrate may help with adhesion, it nonetheless may reduce reflectance, possibly because of increased absorption on the part of the front layer comprising Ni and/or Cr.

EXAMPLE 4

Glass/$Si_3N_4$ (40 angstroms)/NiCr (5 angstroms)/Al (400 angstroms)/Cr (50 angstroms)/$Si_3N_4$ (80 angstroms). RgY (C/2): 78.83%.

EXAMPLE 5

Glass/$Si_3N_4$ (40 angstroms)/Al (400 angstroms)/NiCr (50 angstroms)/$Si_3N_4$ (80 angstroms)/PPF (Nitto-Denko SPV-9310). RgY (C/2): 82.32%.

EXAMPLE 6

Glass/$Si_3N_4$ (40 angstroms)/Al (400 angstroms)/Cr (50 angstroms)/$Si_3N_4$ (80 angstroms)/PPF (Nitto-Denko SPV-9310). RgY (C/2): 81.83%.

EXAMPLE 7

Glass/Si$_3$N$_4$ (40 angstroms)/NiCr (5 angstroms)/Al (400 angstroms)/NiCr (50 angstroms)/Si$_3$N$_4$ (80 angstroms)/PPF (Nitto-Denko SPV-9310). RgY (C/2): 78.87%.

EXAMPLE 8

Glass/Si$_3$N$_4$ (40 angstroms)/NiCr (5 angstroms)/Al (400 angstroms)/Cr (50 angstroms)/Si$_3$N$_4$ (80 angstroms)/PPF (Nitto-Denko SPV-9310). RgY (C/2): 78.83%.

EXAMPLE 9 glass/Al (450 angstroms)/Si$_3$N$_4$ (80 angstroms). RgY (C/2): 84.06%. Although reflectivity was very high, adherence to the substrate is potentially compromised because the Al is in direct contact with the glass. Sodium migration from the underlying substrate may also negatively impact the quality of the Al over time.

EXAMPLE 10

Glass/Si$_3$N$_4$ (40 angstroms)/Al (450 angstroms)/Si$_3$N$_4$ (80 angstroms). RgY (C/2): 82.03%.

EXAMPLE 11

Glass/Si$_3$N$_4$ (40 angstroms)/Al (450 angstroms)/NiCr (5-10 angstroms)/Si$_3$N$_4$ (80 angstroms). RgY (C/2): 82.04%.

EXAMPLE 12

Glass/Al (450 angstroms)/Si$_3$N$_4$ (80 angstroms)/PPF (Nitto-Denko SPV-9310). RgY (C/2): 84.06%.

EXAMPLE 13

Glass/Si$_3$N$_4$ (40 angstroms)/Al (450 angstroms)/Si$_3$N$_4$ (80 angstroms)/PPF (Nitto-Denko SPV-9310). RgY (C/2): 82.03%.

EXAMPLE 14

Glass/Si$_3$N$_4$ (40 angstroms)/Al (450 angstroms)/NiCr (5-10 angstroms)/Si$_3$N$_4$ (80 angstroms)/PPF (Nitto-Denko SPV-9310). RgY (C/2): 82.04%.

It is noted that aluminum may be added to the silicon inclusive layers and/or the layers comprising Ni and/or Cr to help improve sputtering performance. Also, although certain example embodiments have been described as including sputter-deposited layers, it will be appreciated that some or all layers may be deposited by an alternate thin film deposition technique in different embodiments of this invention.

Figure 3:
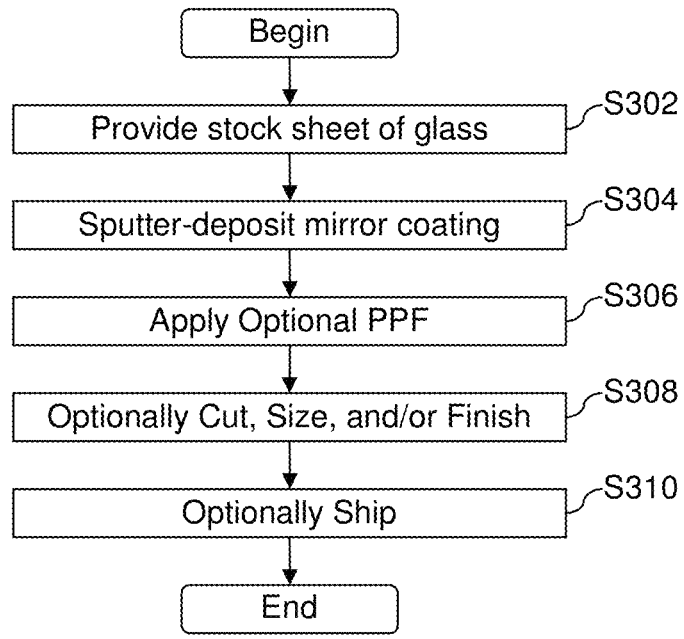
FIG. 3 is a flowchart illustrating an example process for making a mirror in accordance with certain example embodiments.

FIG. 3 is a flowchart illustrating an example process for making a mirror in accordance with certain example embodiments. A stock sheet of glass or glass substrate is provided in step S302. The glass substrate may be any suitable type of glass substrate, e.g., 1.0-10.0 mm thick, more preferably 1-5 mm thick, with example thicknesses of 2.0, 2.3, and 3.0 mm. The mirror coating is sputter deposited on a major surface (e.g., the surface designed to be the second major surface) of the substrate in step S304. Any of the above-described and/or other suitable layer stacks may be used in different embodiments of this invention. In step S306, a PPF is optionally applied, e.g., via a roll coater. The substrate may be cut, sized, and/or finished in step S308, and optionally shipped in step S310. In some cases, the finishing may include beveling, rounding, or chamfering edges, etc. Various washing and/or cleaning steps also may be performed. For instance, clear float glass may be washed prior to coating.

It will be appreciated that the steps need not be performed in the order shown in FIG. 3. For instance, a stock glass substrate may be coated and protected with PPF, shipped to a fabricator, and then optionally cut, sized, and/or finished by the fabricator, where it may then be built into a suitable protect (e.g., a bathroom mirror, decorative home or office mirror, etc.). In one or more steps not shown, the coating may be edge deleted, e.g., such that the PPF is applied directly onto the glass at edge portions. The edge deleted portions in such cases may be built into finished products such that the non-reflective areas are not visible. The PPF nonetheless may protect the entire back surface, although the mirror coating may be better protected because it does not go all the way to the outer edge of the substrate where it may be exposed inadvertently through manufacturing or installation processes that move the PPF, through normal side exposure of a few angstroms or nanometers, etc.

In some cases, a flat surface product may be sold. In other cases, the substrate may be bent (e.g., hot or cold bent) before or after the mirror coating and/or PPF is applied thereto.

In general, there are two main types of adhesive tape for mirror applications. The first type is a permanent protective film, which primarily is intended to help protect the mirror stack from environmental degradation and, for instance, from the long-term effects of moisture.

The second type is a safety tape, which primarily is intended to help reduce the likelihood of injury resulting from glass particles and/or shards produced in the unfortunate event that the mirror is broken. Category I safety tape generally is applied to mirror sizes less than 9 sq. ft. Larger sizes typically require the use of Category II tape.

Currently, the number of safety tape suppliers is very limited. It is believed that all or virtually all current commercially available Category II tapes use a polyolefin woven backing. The backing is designed for a sufficient impact resistance, as well as to help ensure that the weave will not run in the event of mirror rupture or breakage. It also is believed that all or virtually all current commercially available Category II tapes use an acrylic adhesive, which is water-soluble during the tape manufacturing process.

As will be appreciated from the above, an example mirror comprises Glass/SiNx/Al/SiNx, with the coating provided on the second surface. It has been found that the acrylic adhesive of the currently available safety tapes, when applied to this example stack, makes the interface between the stack and the tape extremely sensitive to the humid environment. More particularly, the tape tends to peel off, particularly in the presence of humidity, thereby effectively nullifying the safety properties of the tape and compromising the integrity of the coating.

Certain example embodiments relate to a mirror including a substrate supporting a thin film layer stack with an uppermost layer that helps to make the overall stack "moisture-friendly" when in contact with the tape. More particularly, certain example embodiments involve an outermost layer selected so as to help make its interface with the tape less sensitive to moisture. Thus, the safety tape can remain adhered to the layer stack even in high humidity environments. In certain example embodiments, overcoat materials that may be used to reduce the sensitivity of the thin film mirror coating to moisture comprise oxides and/or nitrides of Sn and/or Ti. Other materials having a high contact angle with respect to water such as, for example, diamond-like carbon (DLC) or the like, also may be used in certain example embodiments. One or more of these and/or other layers therefore may be used in certain example embodiments.

Adhesion theory suggests that the interfacial tension of a liquid and a solid is directly related to the liquid's wettability. In other words, when a thin film surface finds it favorable to interact with a liquid such as water, there are not enough potential sites left to bond this surface to another surface, such as the adhesive of the tape. To increase the adhesive strength of the thin film surface to the adhesive tape in the presence of moisture, certain example embodiments therefore terminate the thin film stack with a material that has a low wettability to water or, in other words, has a high contact angle.

Experiments were performed to quantify the measured pulling force of a sample tape from a thin film mirror stack terminated with layers of various materials. It was found that there is a strong correlation between the measured adhesion force in a humid environment and the contact angle. More particularly, it was found that the higher the contact angle, the more force that is required to separate the tape from the coating in a humid environment. Surprisingly and unexpectedly, no correlation between the adhesion and the coating surface roughness was observed.

A detailed quantitative analysis shows that the adhesion strength of the thin film stack of certain example embodiments can exceed that of the conventional paint-based system, thereby making the high contact angle material overcoat solution superior in safety tape applications to conventionally used painted surfaces.

Figure 4:
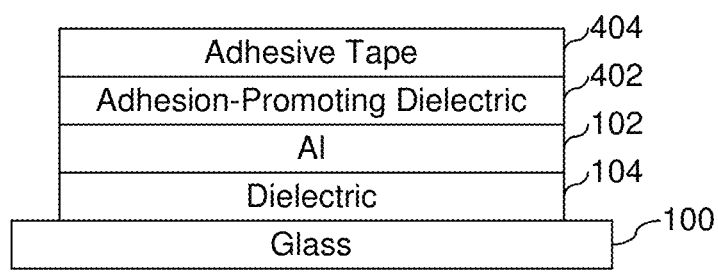
FIG. 4 is a schematic cross-sectional view of a second surface mirror coating with an adhesion-promoting layer in accordance with certain example embodiments of this invention.

FIG. 4 is a schematic cross-sectional view of a second surface mirror coating with an adhesion-promoting layer in accordance with certain example embodiments of this invention. The FIG. 4 example is similar to the examples shown and described in connection with FIGS. 1a and 1b, in that a metallic or substantially metallic layer 102 of or including Al is sandwiched between dielectric layers as a part of a second surface mirror coating, and an adhesive tape 404 is provided so as to help protect the mirror coating. The metallic or substantially metallic layer 102 of or including Al in this example preferably is 30-200 nm thick, more preferably 30-100 nm thick, and still more preferably 40-50 nm thick. The adhesive tape 404 may be a Category I or Category II safety tape, e.g., with an acrylic-based or other adhesive material in certain example embodiments.

The dielectric layer 104, which is provided between the Al-inclusive layer 102 and the glass substrate 100, may be silicon-inclusive in certain example embodiments. For instance, the dielectric layer 104 may comprise or consist essentially of SiOx, SiNx, SiOxNy, etc. In certain other example embodiments, oxides and/or nitrides of different materials may be included in or form the substantial part of the dielectric layer 104. For instance, the dielectric layer 104 may comprise or consist essentially of AlOx, AlOxNy, ZrOx, TiOx, $Y_2O_3$, ZnAlOx, SnOx, etc. Some amount of silicon may be present in such layers, e.g., to aid with deposition, etc. The dielectric layer 104 in this example preferably is 1-20 nm thick, more preferably 1-10 nm thick, with an example thickness being about 4 nm.

The adhesion-promoting dielectric layer 402 preferably has a high contact angle relative to water. The contact angle preferably is at least 40 degrees, more preferably at least 45 degrees, and still more preferably at least 50 degrees. Contact angles up to about 70 degrees have been shown in experiments to produce very good adhesive strength as between the outermost dielectric and the safety tape, although it is possible that yet higher contact angles may be used in different example embodiments. As explained above, the rear dielectric layer 402 may comprise oxides and/or nitrides of Sn and/or Ti. These and/or other materials may be sputter deposited in certain example embodiments, and they may be stoichiometric or sub-stoichiometric (sub-oxided). Other materials having a high contact angle with respect to water such as, for example, diamond-like carbon (DLC) or the like, also may be used in certain example embodiments. The rear dielectric layer 402 preferably has a thickness of 1-20 nm, more preferably 1-15 nm, and still more preferably 1-10 nm, with an example thickness of 9 nm.

Figure 5:
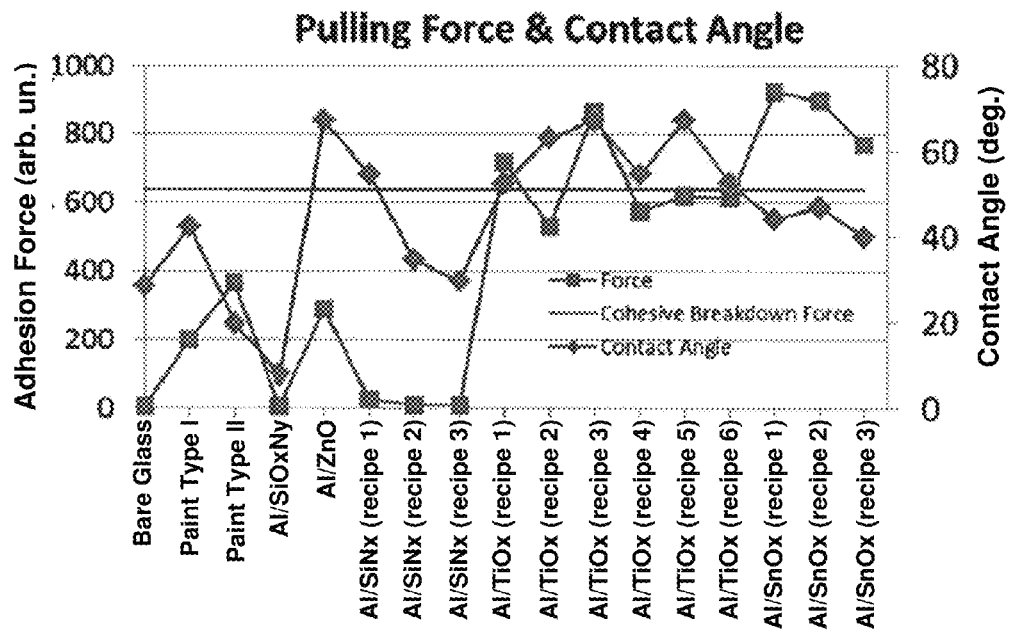
FIG. 5 is a graph demonstrating the correlation between measured pulling force and contact angle for different samples.
Figure 6:
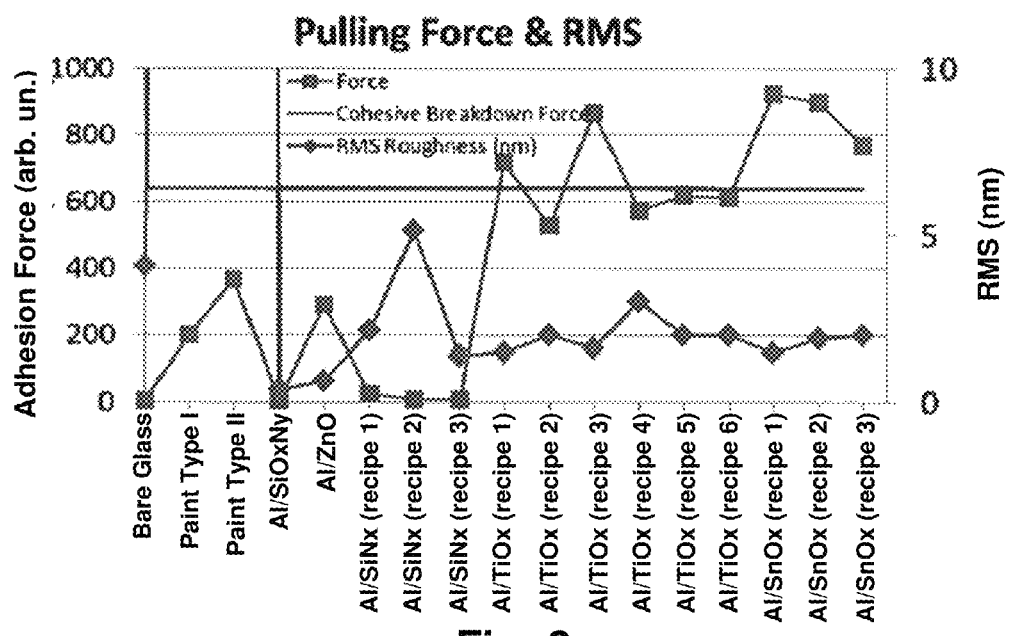
FIG. 6 is a graph demonstrating the lack of correlation between measured pulling force and surface roughness for those different samples.

FIG. 5 is a graph demonstrating the correlation between measured pulling force and contact angle for different samples, and FIG. 6 is a graph demonstrating the lack of correlation between measured pulling force and surface roughness for those different samples. As is known, the higher the contact angle, the lower the surface energy. In FIGS. 5 and 6, the flat line represents the cohesive breakdown force where the adhesive detaches from the tape lining before it detaches from the minor surface. It can be seen from FIG. 5 that adhesion force is higher with higher contact angles (lower surface energies), and the TiOx and SnOx outermost layers that have higher contact angles also are adhered to the backing tape with a stronger adhesion force. It will be appreciated that contact angles greater than 40 degrees are preferable. By contrast, it can be seen from FIG. 6 that the adhesion force is not always higher (or lower) with lower (or higher) RMS roughness of the outermost layers. It may, however, be said that RMS roughness for TiOx and/or SnOx layers preferably should be below 5 nm (and more preferably below 3 nm) in order to provide good adhesion between such layers and the adhesive backing tape.

In FIGS. 5-6, the two paint suppliers were (I) Spraylat-D936G165, which involves a Spraylat E5128 base coat with an E5216 top coat; and (II) Valspar (PPG) GMS-04325, which involves a Valspar GMB3-003275-00 base coat with a GMT5-03490-01 top coat. ShurTape SS-508 was used for the non-paint based samples.

As will be appreciated from the graphs shown in FIGS. 5-6, when SiNx is used as the primary overcoat material with a tape rather than a paint, moisture sensitivity comes into play. The pulling strength for the sample including the silicon oxynitride inclusive overcoat was almost zero, meaning that the tape practically peeled off without any pulling. Attempts were made to alter the Ar-to-N ratio of gas in the deposition chamber, e.g., in connection with a non-oxidized layer comprising silicon nitride. The optimal ratio was determined to result from a just-below stoichiometric environment, but even the optimized coating still showed very little improvement in terms of reduced moisture sensitivity. A ZnOx-inclusive overcoat resulted in improvements over the SiNx inclusive overcoat baseline, as well as the optimized SiNx inclusive overcoat examples, but the adhesion strength still was too low to result in a commercially viable product.

The 12 recipes in FIGS. 5-6 refer to various deposition conditions of SiNx, TiOx, and SnOx. For each of these materials, the Ar-to-gas ratio (in these cases, oxygen) was optimized. The best results were achieved with ratios that were nearly stoichiometric. $Ar:O_2$ ratios for TiOx ranged from 300/0 to 300/50 with the optimal ratio of 300/5 at 0.5 ml/kW. $Ar:O_2$ ratios for SiNx ranged from 300/0 to 300/20, with the optimal ratio of 300/0 at 7 ml/kW. $Ar:O_2$ ratios for SnOx ranged from 300/100 to 300/600, with the optimal ratio of 300/500 at 13 ml/kW.

A wide variety of tapes is commercially available and may be used in connection with different example embodiments of this invention. An example Category I safety tape is ShurTape SS-504, and example Category II safety tapes include Shur-Tape SS-501 and SS-508, as well as Venture safety tapes.

It is noted that the tape-based embodiments may survive the above-described and/or other equivalent tests. When humidity encroachment reducer layers are used, for example, the same, similar, and/or more stringent tests may be met. Peel strength and/or the like may be the same or similar, as well.

Although certain example embodiments have been described in connection with metallic or substantially metallic reflecting layers comprising Al, it is noted that additional and/or alternative materials may be provided in such reflecting layers. For example, reflecting layers comprising Si and Al may be provided, e.g., as disclosed in U.S. application Ser. Nos. 13/770,262 and 13/770,364, both of which were filed on Feb. 19, 2013. The entire contents of each is hereby incorporated herein by reference. In addition, it will be appreciated that Al and Ag based reflectors may be provided with color tuning dielectric layers in certain example embodiments, e.g., as described in U.S. application Ser. No. 13/749,760, filed on Jan. 25, 2013, the entire contents of which is hereby incorporated herein by reference.

In certain example embodiments, a mirror is provided. The mirror includes a glass substrate. A multilayer thin film coating is supported by the substrate. The multilayer thin film coating comprises, in order moving away from the substrate: a first dielectric layer, a metallic or substantially metallic layer comprising aluminum, and a second dielectric layer, with the second dielectric layer being the outermost layer of the thin film coating and having a contact angle of at least 40 degrees. An adhesive material is disposed directly over and contacting the outermost layer of the multilayer thin film coating.

In certain example embodiments, a mirror is provided. The mirror includes a glass substrate. A multilayer thin film coating is supported by the substrate. The multilayer thin film coating comprises a metallic or substantially metallic layer comprising aluminum sandwiched between inner and outer dielectric layers, with the inner dielectric layer being located between at least the substrate and the metallic or substantially metallic layer comprising aluminum. An adhesive tape is directly over and contacting an outermost layer of the multilayer thin film coating. The adhesive tape is adapted to survive seven day exposure to an 85 degree C. temperature at 85% relative humidity, as well as seven day exposure to a 49 degree C. temperature at 100% relative humidity, without peeling away from the outermost layer of the thin film coating.

In certain example embodiments, a method of making a mirror is provided. At least the following layers in the following order are sputter-deposited on a glass substrate to form a coating: a first dielectric layer, a metallic or substantially metallic layer comprising aluminum, and a second dielectric layer. The second dielectric layer is the outermost layer of the thin film coating and has a contact angle of at least 40 degrees. An adhesive material is applied over and contacting the outermost layer of the multilayer thin film coating.

In addition to the features of any of the three previous paragraphs, in certain example embodiments, the second dielectric layer may comprise an oxide and/or nitride of either tin or titanium. For instance, the second dielectric layer may comprise sputter deposited tin oxide, titanium oxide, and/or the like, and may be fully stoichiometric or sub-stoichiometric. In addition to the features of any of the three previous paragraphs, in certain example embodiments, the second dielectric layer may comprise diamond-like carbon.

In addition to the features of any of the four previous paragraphs, in certain example embodiments, the first dielectric layer may comprise an oxide and/or nitride of silicon. In addition to the features of any of the four previous paragraphs, in certain example embodiments, the first dielectric layer may comprise an oxide of Al, Zr, Ti, Y, Zn, or Sn, or the like (e.g., AlOx, AlOxNy, ZrOx, TiOx, $Y_2O_3$, ZnAlOx, SnOx, etc.).

In addition to the features of any of the five previous paragraphs, in certain example embodiments, the metallic or substantially metallic layer comprising aluminum may be 40-50 nm thick.

In addition to the features of any of the six previous paragraphs, in certain example embodiments, at least one of the first and second dielectric layers may be 1-20 nm thick. For instance, the second dielectric layer may be at least about two times as thick as the first dielectric layer.

In addition to the features of any of the seven previous paragraphs, in certain example embodiments, the adhesive material may be Category I or Category II safety tape.

In addition to the features of any of the eight previous paragraphs, in certain example embodiments, the adhesive material may be safety tape that has an acrylic-based adhesive.

In addition to the features of any of the nine previous paragraphs, in certain example embodiments, the mirror may have a glass side reflectance of at least 76% in the visible spectrum.

In addition to the features of any of the 10 previous paragraphs, in certain example embodiments, the adhesive material/tape may have a peel strength of 200-500 cN/20 mm wide strip.

In addition to the features of any of the 11 previous paragraphs, in certain example embodiments, the outermost layer of the multilayer thin film coating may have a contact angle of at least 40 degrees.

In addition to the features of any of the 12 previous paragraphs, in certain example embodiments, the adhesive material may be safety tape that has an acrylic-based adhesive and may be adapted to survive seven day exposure to an 85 degree C. temperature at 85% relative humidity, as well as seven day exposure to a 49 degree C. temperature at 100% relative humidity, with no evidence of delamination of the adhesive material and no evidence of deterioration of the coating.

In certain example embodiments, a mirror made in accordance with any of the 13 previous paragraphs may be received at a fabricator location and cut into pieces of one or more respective desired sizes for making smaller mirrors.

Although certain example embodiments have been referred to as including "permanent protective films," it will be appreciated that the word "permanent" should not be read in a strictest or literal sense. Rather, any film that is capable of surviving the above-described and/or other equivalent tests may be considered a "permanent" protective film. Similarly, any film that can survive the expected lifetime of the overall product may be considered sufficiently "permanent" to comply with the way that word is used herein.

While a layer, layer system, coating, or the like, may be said to be "on" or "supported by" a substrate, layer, layer system, coating, or the like, other layer(s) may be provided therebetween. Thus, for example, the coatings or layers described above may be considered "on" and "supported by" the substrate and/or other coatings or layers even if other layer(s) are provided therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mirror, comprising:
a glass substrate;
a multilayer thin film coating supported by the substrate, the multilayer thin film coating comprising, in order moving away from the substrate:
a first dielectric layer,
a metallic or substantially metallic layer comprising aluminum, and
a second dielectric layer, the second dielectric layer being the outermost layer of the thin film coating and having a contact angle of at least 40 degrees;
and an adhesive tape material disposed directly over and contacting the outermost layer of the multilayer thin film coating, wherein the adhesive tape material is adapted to survive seven day exposure to an 85 degree C. temperature at 85% relative humidity, as well as seven day exposure to a 49 degree C. temperature at 100% relative humidity, without peeling away from the outermost layer of the thin film coating.

2. The mirror of claim 1, wherein the second dielectric layer comprises an oxide and/or nitride of either tin or titanium.

3. The mirror of claim 2, wherein the second dielectric layer comprises sputter deposited tin oxide.

4. The mirror of claim 2, wherein the second dielectric layer comprises sputter deposited titanium oxide.

5. The mirror of claim 1, wherein the second dielectric layer comprises diamond-like carbon.

6. The mirror of claim 1, wherein the first dielectric layer comprises an oxide and/or nitride of silicon.

7. The mirror of claim 1, wherein the first dielectric layer comprises an oxide of Al, Zr, Ti, Y, Zn, or Sn.

8. The mirror of claim 1, wherein the metallic or substantially metallic layer comprising aluminum is 40-50 nm thick.

9. The mirror of claim 1, wherein at least one of the first and second dielectric layers is 1-20 nm thick.

10. The mirror of claim 9, wherein the second dielectric layer is at least about two times as thick as the first dielectric layer.

11. The mirror of claim 1, wherein the adhesive material is Category I or Category II safety tape.

12. The mirror of claim 1, wherein the adhesive material is safety tape that has an acrylic-based adhesive.

13. The mirror of claim 1, wherein the mirror has a glass side reflectance of at least 76% in the visible spectrum.

14. A mirror, comprising:
a substrate;
a multilayer thin film coating supported by the substrate, the multilayer thin film coating comprising a metallic or substantially metallic layer comprising aluminum sandwiched between inner and outer dielectric layers, the inner dielectric layer being located between at least the substrate and the metallic or substantially metallic layer comprising aluminum;
an adhesive tape directly over and contacting an outermost layer of the multilayer thin film coating, wherein the outermost layer of the multilayer thin film coating has a contact angle of at least 40 degrees; and
wherein the adhesive tape is adapted to survive seven day exposure to an 85 degree C. temperature at 85% relative humidity, as well as seven day exposure to a 49 degree C. temperature at 100% relative humidity, without peeling away from the outermost layer of the thin film coating.

15. The mirror of claim 14, wherein the adhesive tape has a peel strength of 200-500 cN/20 mm wide strip.

16. A method of making a mirror, the method comprising:
sputter-depositing on a glass substrate a coating comprising at least the following layers in the following order:
a first dielectric layer,
a metallic or substantially metallic layer comprising aluminum, and
a second dielectric layer, wherein the second dielectric layer is the outermost layer of the thin film coating and has a contact angle of at least 40 degrees; and
applying an adhesive tape material over and contacting the outermost layer of the multilayer thin film coating, wherein the adhesive tape material is safety tape that has an acrylic-based adhesive and is adapted to survive seven day exposure to an 85 degree C. temperature at 85% relative humidity, as well as seven day exposure to a 49 degree C. temperature at 100% relative humidity, with no evidence of delamination of the adhesive material and no evidence of deterioration of the coating.

17. The method of claim 16, wherein the second dielectric layer comprises $SnN_x$, $SnO_xN_y$, $TiN_x$, $TiO_xN_y$, or diamond-like carbon.

18. The method of claim 17, wherein the second dielectric layer consists essentially of a sub-oxidized metal oxide.

19. The method of claim 16, further comprising:
receiving, at a fabricator location, a mirror made in accordance with the method of claim 16; and
cutting the coated article into pieces of one or more respective desired sizes for making smaller mirrors.

* * * * *